(No Model.)
G. C. JOHNSON.
WHIFFLETREE CLIP.
No. 346,589. Patented Aug. 3, 1886.
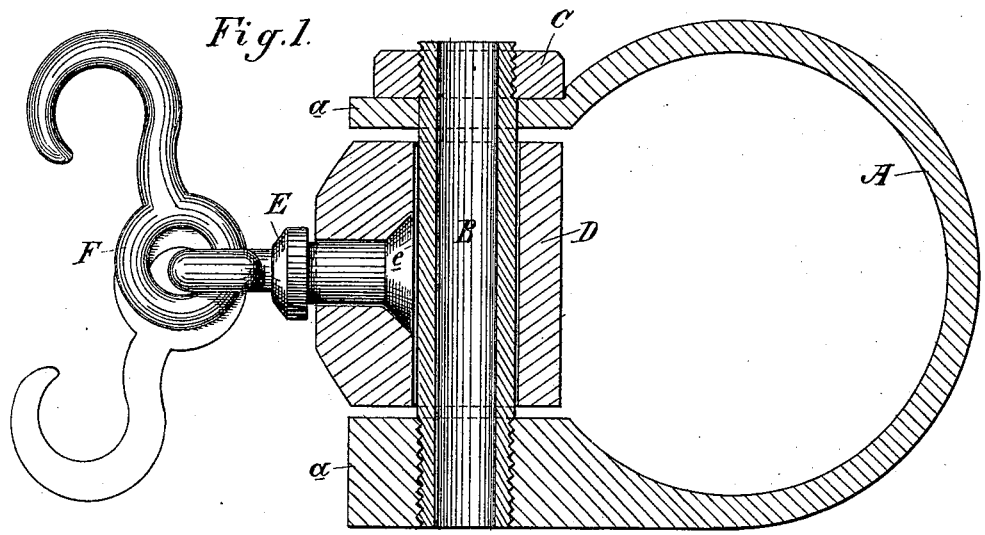
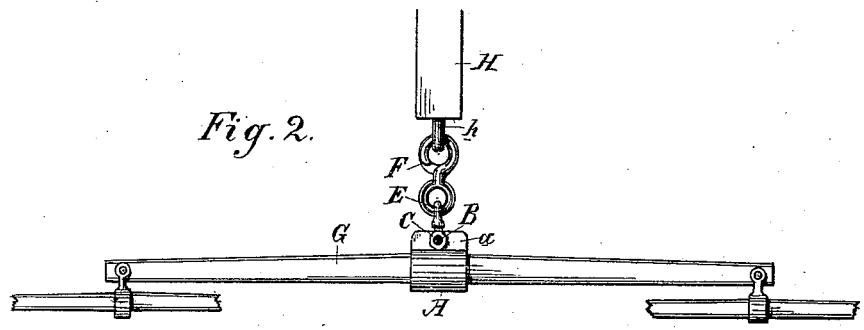
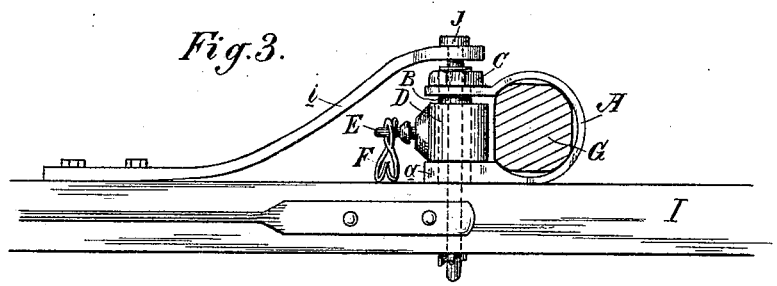
Witnesses,
Geo. H. Strong.
J. S. Howse.
Inventor,
Geo. C. Johnson
By Dewey & Co.
Att'ys

UNITED STATES PATENT OFFICE.

GEORGE C. JOHNSON, OF FORT BRAGG, CALIFORNIA.

WHIFFLETREE-CLIP.

SPECIFICATION forming part of Letters Patent No. 346,589, dated August 3, 1886.

Application filed April 9, 1886. Serial No. 198,395. (No model.)

*To all whom it may concern:*

Be it known that I, GEORGE C. JOHNSON, of Fort Bragg, Mendocino county, State of California, have invented an Improvement in Whiffletree Clips and Hooks; and I hereby declare the following to be a full, clear, and exact description of the same.

My invention relates to a new and useful clip and swiveled-hook connection, and it consists in a curved clamp or clip for embracing a whiffletree, and having parallel separated jaws; a hollow or tubular bolt passing through the upper jaw and screwed into the lower jaw; a nut seated on top of the bolt, whereby it may be made to tighten up the clamp upon the whiffletree; a block or piece pivoted loosely on the bolt between the jaws; an eyebolt swiveled in the block or piece, and a hook connected with the eyebolt, all of which I shall hereinafter fully describe.

The object of my invention is to provide a simple and effective means for readily attaching and detaching a double-tree to and from any implement without the use of of a clevis, and for attaching it to the pole of a vehicle, or for attaching a single-tree to the double-tree.

Referring to the accompanying drawings for a more complete explanation of my invention, Figure 1 is a vertical longitudinal section of my whiffletree clip and hook. Fig. 2 shows its application to a whiffletree. Fig. 3 shows its application to a pole.

A is a curved piece, forming a clamp or clip, and adapted, as shown in Fig. 2, to embrace the double-tree. It is provided with parallel projecting jaws *a*.

B is a hollow or tubular bolt passing through the upper jaw, and provided with a threaded lower end, by which it is screwed into the lower jaw.

C is a nut threaded upon the upper end of the bolt B. D is a piece or block loosely pivoted in bolt B, between the jaws *a*, and adapted to turn upon the bolt through an arc in a horizontal plane.

E is an eyebolt loosely pivoted in the front of the block, and provided with a head, *e*, held in said block, whereby the eyebolt may be oscillated.

F is a pair of what are known as "sister hooks," consisting of two independent pieces, each formed with an eye engaging the eyebolt, and oppositely-arranged hooks, which, when separated, permit the entrance of another link, which is secured when the hooks are brought together again.

I do not claim the sister hooks as novel of themselves, but I show them merely as an effective form of readily-applied hooks, which may be used.

The use of my clip and hook is shown in Fig. 2.

G is the double-tree, which is to be attached to some implement—say, for example, a plow—of which H is the beam, having a front link or staple, *h*. The clamp or clip A is fitted upon the center of the double-tree, and is tightened thereon by screwing down the nut C. The sister hooks are separated and made to receive, and then to engage, the link *h* of the beam H. By reason of the oscillating movement of the eyebolt E and the movement of the block D upon the bolt B it is obvious that the double-tree has its necessary and customary freedom of action. It may be readily attached to the implement and as readily detached therefrom. Fig. 3 shows its use in attaching the double-tree to a pole. Here the device is turned forwardly, and the pole I passes beneath the jaws, while its back-strap *i* passes above. A pin, J, is passed through the back-strap, through the hollow bolt B and the pole, and is properly secured. The eyebolt E and the sister hooks F, lying between the pole and the back-strap, will not be found to be in the way.

It is obvious that I may place the clip and hook upon the center of a single-tree, and attach it to a suitable link or hook on the end of the double-tree.

Having thus described my invention, what I claim as new, and desire to secure by Letters Patent, is—

1. A whiffletree clip and hook comprising a clamp for embracing the whiffletree, a bolt for tightening the clamp to its seat, a hook for engaging the implement to which the whiffletree is to be attached, and a swivel-connection between the hook and the bolt, substantially as herein described.

2. A whiffletree clip and hook comprising a clamp for embracing the whiffletree, and provided with projecting jaws, a bolt passing through said jaws for tightening the clamp to its seat, a block or piece pivoted upon said bolt, a hook, and an oscillating connection between the hook and the block or piece, substantially as herein described.

3. A whiffletree clip and hook comprising a clamp for embracing the whiffletree, and provided with projecting jaws, a bolt passing through said jaws for tightening the clamp, a block or piece pivoted on the bolt, an eyebolt swiveled in the block or piece, and a hook connected with the eyebolt, substantially as herein described.

4. The clamp or clip A, having jaws $a$, the bolt B, passing through the jaws, and the nut C on top of the bolt, whereby the clamp is secured to the whiffletree, in combination with a hook and a swivel-connection between the hook and the bolt, substantially as herein described.

5. The clamp or clip A, having jaws $a$, the bolt B, passing through the upper and screwed into the lower jaw, and the nut C on top of the bolt, whereby the clamp is secured to the whiffle-tree, in combination with the block or piece D, pivoted on bolt B, the eyebolt E, swiveled in the block or piece, and a hook connected with the eyebolt, substantially as herein described.

6. The clamp or clip A, for embracing a double-tree, in combination with the tubular bolt B, for securing it, and for receiving a pin securing the double-tree to a pole, substantially as herein described.

7. The clamp or clip A, for embracing a double-tree, and having jaws $a$, in combination with the bolt B, passing through the upper jaw and screwed into the lower jaw, said bolt being hollow or tubular to receive a pin securing the double-tree to a pole, and the nut C on top of the bolt B, substantially as herein described.

8. A whiffletree clip and hook comprising the clamp A, having jaws $a$, the tubular bolt B, passing through the upper jaw and screwed into the lower jaw, the nut C on the top of the bolt, the block or piece D, pivoted on the bolt between the jaws, the eyebolt E, swiveled in the block or piece, and the sister hooks F, consisting of independent pieces, each having an eye engaging the eyebolt, and oppositely-arranged hooks, all arranged and adapted to operate substantially as herein described.

In witness whereof I have hereunto set my hand.

GEORGE C. JOHNSON.

Witnesses:
JENKINS A. FITZGERALD.
T. H. HOUSTON.